(12) United States Patent
Takeuchi et al.

(10) Patent No.: US 7,621,673 B2
(45) Date of Patent: Nov. 24, 2009

(54) CAPILLARY TUBE FOR HOLDING OPTICAL FIBER

(75) Inventors: Hirokazu Takeuchi, Shiga-ken (JP); Nobuo Funabiki, Shiga-ken (JP); Sotohiro Nakajima, Shiga-ken (JP)

(73) Assignee: Nippon Electric Glass Co., Ltd., Shiga-ken (JP)

( * ) Notice: Subject to any disclaimer, the term of this patent is extended or adjusted under 35 U.S.C. 154(b) by 203 days.

(21) Appl. No.: 11/703,178

(22) Filed: Feb. 7, 2007

(65) Prior Publication Data

US 2007/0183735 A1    Aug. 9, 2007

(30) Foreign Application Priority Data

Feb. 8, 2006  (JP) .............................. 2006-031273

(51) Int. Cl.
  *G02B 6/38* (2006.01)
(52) U.S. Cl. .......................................... 385/60; 385/78
(58) Field of Classification Search ............ 385/33–51; 250/227.14–227.19; 356/317–19; 422/55–58
See application file for complete search history.

(56) References Cited

U.S. PATENT DOCUMENTS

| | | | | |
|---|---|---|---|---|
| 3,800,388 A * | 4/1974 | Borner et al. ................. 29/464 |
| 3,936,143 A * | 2/1976 | Sato ............................ 385/67 |
| 4,045,121 A * | 8/1977 | Clark .......................... 385/58 |
| 4,113,346 A * | 9/1978 | Jackson et al. ................ 385/84 |
| 4,562,632 A * | 1/1986 | Parchet et al. ............. 29/281.1 |
| 4,645,295 A * | 2/1987 | Pronovost .................... 385/55 |
| 4,859,223 A * | 8/1989 | Kajioka et al. ................ 65/403 |
| 4,913,521 A * | 4/1990 | Tajima et al. ................ 385/126 |
| 4,932,740 A * | 6/1990 | Berkey et al. ................. 385/43 |
| 4,994,134 A * | 2/1991 | Knecht et al. ................ 156/294 |
| 5,276,751 A * | 1/1994 | Grard et al. ................... 385/66 |
| 5,305,413 A * | 4/1994 | Payne ......................... 385/128 |
| 5,482,525 A * | 1/1996 | Kajioka et al. ................ 65/398 |
| 5,499,310 A * | 3/1996 | Ueda ............................ 385/84 |
| 5,625,730 A * | 4/1997 | Ishikawa et al. .............. 385/49 |
| 5,689,578 A * | 11/1997 | Yamauchi et al. ........... 385/123 |
| 6,151,916 A * | 11/2000 | Rabinovich ................ 65/30.13 |
| 6,322,256 B1 * | 11/2001 | Inada et al. ................... 385/84 |
| 6,360,565 B1 * | 3/2002 | Christoff et al. .............. 65/403 |
| 6,428,215 B1 * | 8/2002 | Nault .......................... 385/78 |
| 6,480,657 B1 * | 11/2002 | Dai ............................ 385/123 |
| 6,580,860 B1 * | 6/2003 | Varner ....................... 385/123 |
| 6,738,549 B2 * | 5/2004 | Inaba et al. ................. 385/123 |
| 6,741,776 B2 * | 5/2004 | Iwashita et al. ............... 385/49 |
| 6,746,160 B2 * | 6/2004 | Takeuti et al. ................. 385/84 |
| 6,764,224 B2 * | 7/2004 | Brun et al. .................... 385/84 |
| 7,016,582 B2 * | 3/2006 | Okazaki et al. ............. 385/123 |
| 2001/0019645 A1 * | 9/2001 | Edwards et al. .............. 385/56 |
| 2001/0055449 A1 * | 12/2001 | Sherrer ........................ 385/84 |

(Continued)

FOREIGN PATENT DOCUMENTS

JP    56-128909    10/1981

(Continued)

*Primary Examiner*—Frank G Font
*Assistant Examiner*—Peter Radkowski
(74) *Attorney, Agent, or Firm*—Wenderoth, Lind & Ponack, L.L.P.

(57) ABSTRACT

One or a plurality of flat portions and one or a plurality of partial cylindrical portions connected to such flat portions are an exterior surface of a glass capillary tube for holding an optical fiber, with all partial cylindrical portions having the same single central axis and being defined by a common radius, and an insertion hole, into which an optical fiber is inserted and held, is formed at a position deviated from the central axis in a direction perpendicular to one of the flat portions, which serves as a benchmark.

10 Claims, 6 Drawing Sheets

U.S. PATENT DOCUMENTS

| | | | |
|---|---|---|---|
| 2002/0039472 A1* | 4/2002 | Takeuti et al. | 385/84 |
| 2002/0110332 A1* | 8/2002 | Clarkin et al. | 385/78 |
| 2002/0118929 A1 | 8/2002 | Brun et al. | |
| 2002/0141717 A1* | 10/2002 | Inaba et al. | 385/123 |
| 2003/0048996 A1* | 3/2003 | Lowe et al. | 385/81 |
| 2004/0050113 A1* | 3/2004 | Hwang et al. | 65/440 |
| 2004/0114895 A1* | 6/2004 | Okazaki et al. | 385/123 |
| 2005/0031280 A1* | 2/2005 | Izoe et al. | 385/123 |

FOREIGN PATENT DOCUMENTS

| | | |
|---|---|---|
| JP | 02-236508 | 9/1990 |
| JP | 05-215945 | 8/1993 |
| JP | 08-086934 | 4/1996 |
| JP | 2001-318270 | 11/2001 |
| JP | 2003-066279 | 3/2003 |
| JP | 2003-287651 | 10/2003 |

* cited by examiner

CAPILLARY TUBE FOR HOLDING OPTICAL FIBER

FIELD OF THE INVENTION

The present invention relates to a capillary tube for holding an optical fiber, particularly, a capillary tube for holding an optical fiber in which one or a plurality of insertion holes are formed into which such optical fiber is inserted and held.

BACKGROUND OF THE INVENTION

As is commonly known, a glass capillary tube for holding an optical fiber (hereinafter, glass capillary tube), in which an insertion hole is formed into which the optical fiber is inserted and held, is used for holding the optical fiber in alignment with an optical axis of an optical component such as optical waveguide-type device. The glass capillary tube is fixed to an end surface of the optical component in a straight line in such a way that a central axis of the insertion hole and the optical axis of the optical component are precisely positioned. In this case, both the optical component and the glass capillary tube are usually provided on the same flat surface of a substrate (or casing or holder).

As specific examples, Patent Document 1 below discloses a glass capillary tube of which an exterior surface is substantially rectangular in shape (composed of four flat portions) and in a center of which an insertion hole, into which a single-core optical fiber is inserted and held, is formed, and an optical component is connected to the glass capillary tube in a straight line. According to Patent Document 1, positioning of an optical axis of the optical fiber inserted into and held by the insertion hole, and an optical axis of the optical component, are determined by utilizing the flat portions on the exterior surface of the glass capillary tube.

Patent Document 2 below discloses a glass capillary tube of which an exterior surface is composed of a single flat portion and a single partial cylindrical portion, and in which an insertion hole, for inserting and holding an optical fiber corresponding to a central axis of the partial cylindrical portion, is formed, and a rectangular optical waveguide device is connected to the glass capillary tube in a straight line. According to Patent Document 2, in a state where an auxiliary member is fixed to an upper surface of a connecting end of the optical waveguide device, the flat portion of the glass capillary tube and a bottom surface of the optical waveguide device are provided on a base plane such that both are flushed with each other.

Patent Document 3 below discloses an optical waveguide device, of which a cross-section is approximately circular in shape, and a ferrule, of which a cross-section is approximately circular in shape for holding an optical fiber, provided such that respective end surfaces of the optical waveguide device and the ferrule are connected and held in an inner opening of a single sleeve, and an insertion hole in the ferrule into which the optical fiber is inserted and held is formed at a position deviated (de-centered) from a center of the ferrule.

[Patent Document 1] Japanese Unexamined Publication No. 2001-318270

[Patent Document 2] Japanese Unexamined Publication No. 2003-287651

[Patent Document 3] Japanese Unexamined Publication No. H2-236508

SUMMARY OF THE INVENTION

However, as disclosed in Patent Document 1, when the exterior surface of the glass capillary tube is substantially rectangular in shape (with limited chamfers), during a skewing process of an end surface at a final stage of production of the glass capillary tube after the exterior surface has been formed into a rectangular shape, problems such as the glass capillary tube not being adequately held by a jig and difficulty in producing a jig that can adequately hold the glass capillary tube will occur. In particular, when a glass capillary tube of which an exterior surface is rectangular in shape is held by a jig composed of a pair of grippers, only two opposing surfaces on the exterior surface are in contact with the jig. Therefore, movement of the glass capillary tube relative to the jig in a direction parallel to the two surfaces and perpendicular to a central axis cannot be controlled, and thus each corner of the four surfaces on the exterior surface has to be in contact with the jig. In this case, as the jig is in point contact or line contact with each corner of the exterior surface of the glass capillary tube, chipping and breaking may occur. In order to avoid such problems, the jig may be in surface contact with a periphery of each corner, in which case a shape of an inner surface (contact surface) of the jig will become inappropriately complicated, or the jig may be in surface contact with four surfaces of the flat portions, in which case two pairs of (total four) grippers are required. Either way, production of the jig is extremely difficult.

On the other hand, as disclosed in Patent Document 2, when the exterior surface of the glass capillary tube is composed of a single flat portion and a single partial cylindrical portion and the insertion hole is formed at the center in a diametrical direction of the partial cylindrical portion, a dimension of the flat portion of the glass capillary tube in a widthwise direction is determined according to a height of a core of the optical waveguide device, and hence a shape of the exterior surface of the glass capillary tube is strictly restricted by structure of the optical waveguide device. As a result, problems such as, a required dimension of the flat portion in the widthwise direction not being achieved, the glass capillary tube not being stably provided on a base plane, and an adhering surface with the optical waveguide device not being secured, will occur.

According to Patent Document 3, the insertion hole in the ferrule deviates from the center of the ferrule only by a distance corresponding to a de-centralized distance of a core of the optical waveguide device, and an exterior surface of the ferrule is approximately circular in shape without a flat portion. Therefore, when an adhering surface of the optical waveguide device is rectangular in shape or approximately rectangular in shape such as in the above described Patent Documents 1 and 2, a great disadvantage in securing an adhering area of the ferrule and the optical waveguide device, and in aligning the ferrule with the optical waveguide device, will occur.

In view of the above problems, a technical object of the present invention is to simultaneously solve problems related to a jig during a skewing process of an end surface at a final stage of production of a capillary tube, with a shape of an exterior surface of the capillary tube being strictly restricted by structure of an optical component (for example, optical waveguide device), and by an adhering area and alignment of the capillary tube and the optical component when an adhering surface of the optical waveguide device is rectangular in shape or approximately rectangular in shape.

In order to solve the technical problems, the present invention provides a capillary tube for holding an optical fiber, the capillary tube being formed with an insertion hole in which an optical fiber is held, wherein one or a plurality of flat portions and one or a plurality of partial cylindrical portions connecting the flat portion(s) are formed on an exterior surface, and all the partial cylindrical portions have the same single central axis (axis of origin) and are defined by a common radius, and the insertion hole is formed at a position deviated from a central axis in a direction perpendicular to a first flat portion serving as a benchmark. In this case, the insertion hole into which the optical fiber is inserted and held may be single or plural (for example, a plurality of insertion holes may be arranged in a direction parallel to the first flat portion).

According to such structure, since the single or plurality of partial cylindrical portions on the exterior surface of the capillary tube are formed from a single central axis and have the same radius, the capillary tube can be adequately held by a jig with a simple structure during a skewing process of an end surface at a final stage of production of the capillary tube after the exterior surface has been formed into the above predetermined shape. Particularly, since the single or plurality of partial cylindrical portions are formed on the exterior surface of the capillary tube and all the partial cylindrical portions have the same single central axis and are defined by a common radius, when for example, each contact surface of a pair of jigs is formed such that both can have the same single central axis and be defined by a common radius during actual gripping, the pair of jigs can be in surface contact with all the partial cylindrical portions. As in this example, since the jig with a simple shape can be in surface contact with the exterior surface of the capillary tube without increasing parts count, structure of the jig becomes extremely simple and a cost of producing thereof decreases. In addition, with surface contact, a probability of chipping and breaking of the capillary tube can be significantly reduced.

Further, since the insertion hole in the capillary tube deviates from the central axis in a direction perpendicular to the first flat portion, which serves as a benchmark for one or a plurality of flat portions, a position of an optical axis of the optical component (for example, optical waveguide device) and a position of the insertion hole in the capillary tube can be aligned by changing a degree of such deviation. Therefore, a dimension of the first flat portion in a widthwise direction or a shape of the exterior surface of the capillary tube are not readily restricted by structure of the optical component, and hence the capillary tube can be stably provided on a base plane by increasing the dimension of the first flat portion to a required length in the widthwise direction. In addition, even when an adhering end surface of the optical component is rectangular or approximately rectangular in shape, an adhering area between the capillary tube and the optical component can be sufficiently secured and a precise adhering strength can be achieved.

Since the capillary tube includes one or a plurality of flat portions, the capillary tube will not rotate around the central axis. Moreover, since the insertion hole is formed at a position deviating from the central axis in a direction perpendicular to the first flat portion, which serves as a benchmark, such that the central axis of the insertion hole and the optical axis of the optical component are approximately matched, a core of the optical component and a core of the optical fiber held in the insertion hole of the capillary tube are in a state of approximate alignment. Even when not in alignment, deviation will be small and an alignment process can be readily performed by a mere slight adjustment.

In this case, it is preferable that the insertion hole is formed at a position deviating from a center between the first flat portion and an end portion on an opposite side thereof in a direction perpendicular to the flat portion. Accordingly, by using a center in the direction perpendicular to the first flat portion of the capillary tube as a benchmark, since the insertion hole is formed at a position deviated from such center in the same direction, when the optical axis (core) of the optical component rigidly connected to the capillary tube in a straight line is provided at a position deviated from the center in a height-wise direction, such as the optical waveguide device for example, the insertion hole of the capillary tube and the optical axis of the optical component can be approximately aligned. Since the optical axis of such kind of optical component usually deviates from the center to an upper side in the height-wise direction, when aligning the insertion hole and the optical axis under a condition where the first flat portion of the capillary tube and a bottom surface of the optical component are in contact with the base plane, it is preferable that the insertion hole deviates from the center to a side opposite to the first flat portion, using the center in the direction perpendicular to the first flat portion of the capillary tube as a benchmark.

It is preferable that a second flat portion is formed parallel to the first flat portion on the exterior surface of the capillary tube.

Accordingly, when the adhering end surface of the above optical component is rectangular or approximately rectangular in shape, an upper edge and lower edge of such end surface can be respectively aligned with the first flat portion and the second flat portion of the capillary tube. Therefore, an adhering area of the optical component and the capillary tube can be effectively enlarged.

In this structure, partial cylindrical portions can be respectively formed between the first flat portion and the second flat portion on the exterior surface of the capillary tube.

Accordingly, the exterior surface of the capillary tube is composed of the first flat portion, the second flat portion parallel thereto, a first partial cylindrical portion connecting an end of the first flat portion in a widthwise direction and an end of the second flat portion in the widthwise direction, and a second partial cylindrical portion connecting another end of the first flat portion in the widthwise direction and another end of the second flat portion in the widthwise direction. In this case, in view of adhering to an optical component of which an optical axis is provided on a top side from the center in the height-wise direction, such as the above described optical waveguide device, and from a view point of stability and securing an adhering area, it is preferable that a dimension of the first flat portion (the flat portion in contact with the base plane), which serves as a benchmark, in the widthwise direction is the same as or longer than a dimension of the second flat portion in the widthwise direction.

As a variation of the above structure, a third flat portion and a fourth flat portion on the exterior surface of the capillary tube can be formed perpendicular to the first flat portion and the second flat portion, and provided on both sides of the first and second flat portions in the widthwise direction.

Accordingly, this is most favorable in increasing an adhering area of the optical component and the capillary tube when the capillary tube is adhered, in a straight line, to the optical component of which an adhering end surface is rectangular or approximately rectangular in shape.

In this structure, partial cylindrical portions can be respectively formed between the first flat portion, the second flat portion, the third flat portion and the fourth flat portion on the exterior surface of the capillary tube.

Accordingly, the exterior surface of the capillary tube is composed of the first flat portion, the second flat portion parallel thereto, the third flat portion and the fourth flat portion respectively perpendicular to and provided on one side and another side of the first and second flat portions in a widthwise direction, and the first to fourth partial cylindrical portions formed between and adjacent to the first to fourth flat portions. In this case, in view of adhering to the optical component of which an optical axis is provided on a top side from the center in the height-wise direction, such as the above described optical waveguide device, and from a view point of stability and securing an adhering area, it is preferable that a dimension of the first flat portion (the flat portion in contact with a base plane), which serves as a benchmark, in the widthwise direction is the same as or longer than a dimension of the second flat portion in the widthwise direction.

In the above structure, it is preferable that a total region of the partial cylindrical portions is at least 3% (more preferably at least 10%) of an entire exterior surface. It is preferable that an upper limit for this value is 90%. Accordingly, by forming all the partial cylindrical portions such that they have the same single central axis and are defined by a common radius, the above described effects can be achieved.

It is preferable that the capillary tube having the above structure is composed of a material with a thermal expansion coefficient of 0 to $80 \times 10^{-7}$/K under an operating temperature range.

Accordingly, not only can a problem such as thermal deformation of the capillary tube be adequately suppressed, but an adverse effect on an adhering portion between the capillary tube and an optical component due to changes in temperature is also not likely to occur, and an excellent optical characteristic can be maintained. Further, although the capillary tube having the above structure can be made of ceramics, plastics, metal or the like, it is preferable that the capillary tube is composed of a glass material. This is because for a glass capillary tube, a polishing process of a connecting portion can be easily performed and ultraviolet curable adhesive can be used, and hence an assembly cost can be reduced. In addition, since drawing process technology can be adopted for production, production cost can also be reduced. Moreover, compositions having the same thermal expansion coefficient as the optical fiber can also be utilized. For the glass material, borosilicate glass, quartz glass, and crystallized glass in the $Li_2O$—$Al_2O_3$—$SiO_2$ system can be used, but borosilicate glass is particularly preferable.

It is preferable that the glass capillary tube having the above structure is produced by performing a drawing process.

In a case of producing such kind of glass capillary tube using a drawing process, an external dimension is measured by a laser during this forming process. When an exterior surface of the glass capillary tube (preformed) is rectangular in shape, and when a deviation around central axis X occurs as glass capillary tube 1A is in a position, as illustrated in FIG. 10, a measured width Wa of the exterior surface will be larger than actual width W, and an external diameter of the glass capillary tube cannot be measured precisely. As a result, dimensional control of the drawing process cannot be accurately performed and errors will occur in an external diameter of a formed glass capillary tube.

However, when a glass capillary tube having the above described structure is produced by a drawing process, since all partial cylindrical portions have the same single central axis and are defined by a common radius, even when a deviation around the central axis occurs due to positioning of the glass capillary tube during measuring of an external diameter in this forming process, the external diameter of the glass capillary tube measured will never change regardless of deviation of positioning. Therefore, the external diameter of the glass capillary tube can be precisely measured, accurate dimensional control of the drawing process can be maintained, and error or variation in a final external diameter of a formed glass capillary tube is not likely to occur.

As described above, according to the capillary tube for holding an optical fiber related to the present invention, the capillary tube can be adequately held by a jig with a simple structure during a skewing process of a end surface at a final stage of production of the capillary tube, structure of the jig becomes extremely simple and a cost of producing thereof decreases, and a probability of chipping and breaking of the capillary tube can be significantly reduced. Further, a dimension of a first flat portion in a widthwise direction or a shape of an exterior surface of the capillary tube are not readily restricted by structure of an optical component, and hence the capillary tube can be stably provided on a base plane by increasing a dimension of the first flat portion to a required length in the widthwise direction, and even when an adhering end surface of the optical component is rectangular or approximately rectangular in shape, an adhering area between the capillary tube and the optical component can be sufficiently secured and a precise adhering strength can be achieved. In addition, since the capillary tube includes one or a plurality of flat portions, and an insertion hole is formed at a position deviated from a central axis in a direction perpendicular to the first flat portion, which serves as a benchmark, such that an optical axis of the optical component and the central axis of the insertion hole are approximately matched, a process for aligning a core of the optical component with a core of the optical fiber held in the insertion hole of the capillary tube can be easily performed.

DETAILED DESCRIPTION OF THE PREFERRED EMBODIMENTS

Hereinafter, an embodiment of the present invention will be described with reference to the accompanying drawings.

Figure 1:
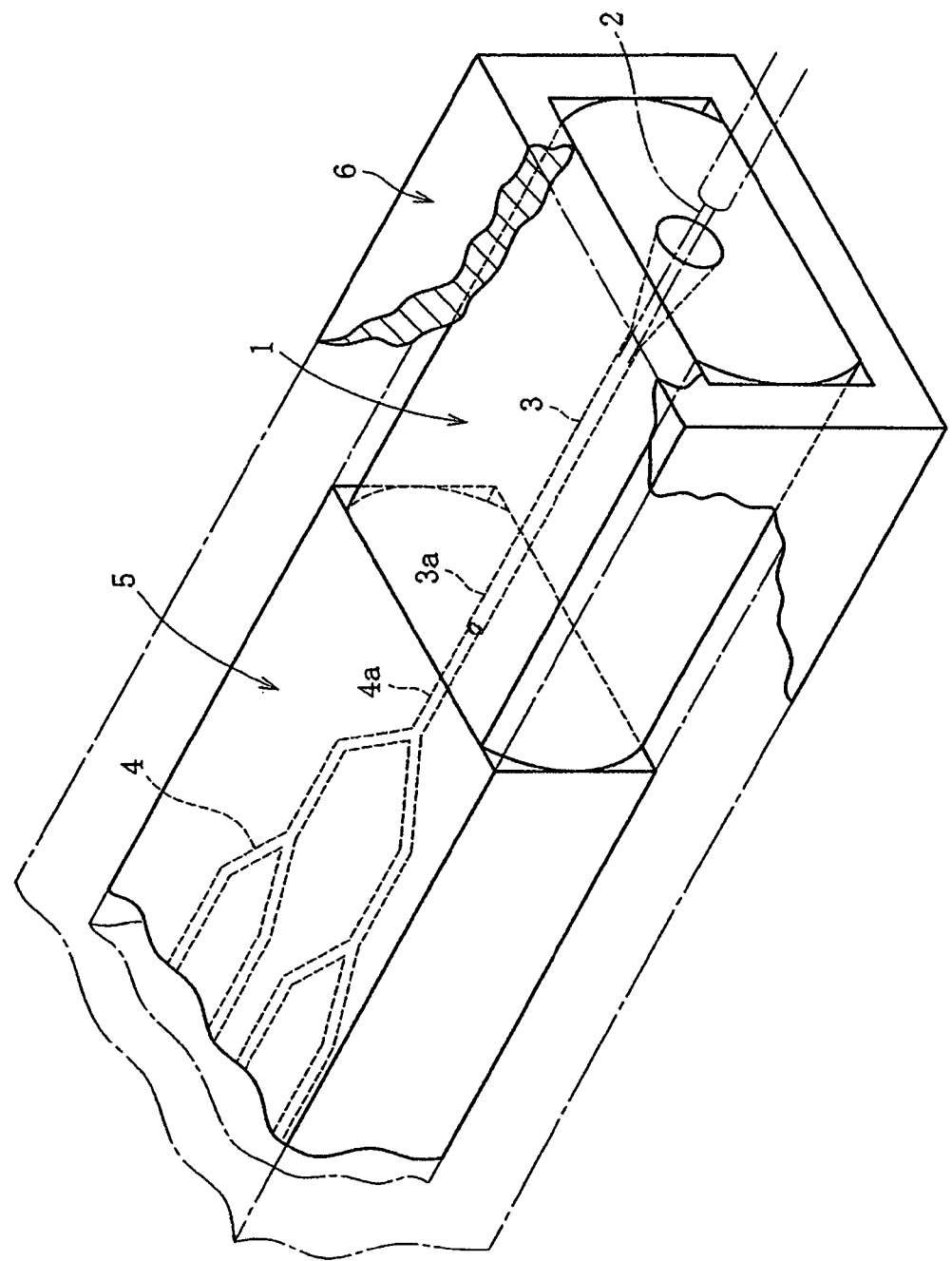
FIG. 1 is a perspective view illustrating a glass capillary tube for holding an optical fiber, and an overview structure of its periphery related to a first embodiment of the present invention.

FIG. 1 represents a glass capillary tube for holding an optical fiber and an overview structure of its periphery related to a first embodiment of the present invention. As illustrated in the same drawing, the glass capillary tube 1 includes an insertion hole 3 through which a single-core optical fiber 2 is inserted and held within, and an optical waveguide device 5 serving as an optical component with a core 4 is firmly adhered to and in-line with an end (front end) of the optical fiber in an optical axis direction. This firmly adhered glass capillary tube 1 and the optical waveguide device 5 are packaged and housed within a casing (holder) 6. In this case, a front end 3a of the insertion hole 3 in the glass capillary tube 1 and a rear end 4a of the core 4 in the optical waveguide device 5 are pushed against and connected to each other in alignment at an adhering surface of the glass capillary tube 1 and the optical waveguide device 5.

Figure 2A:
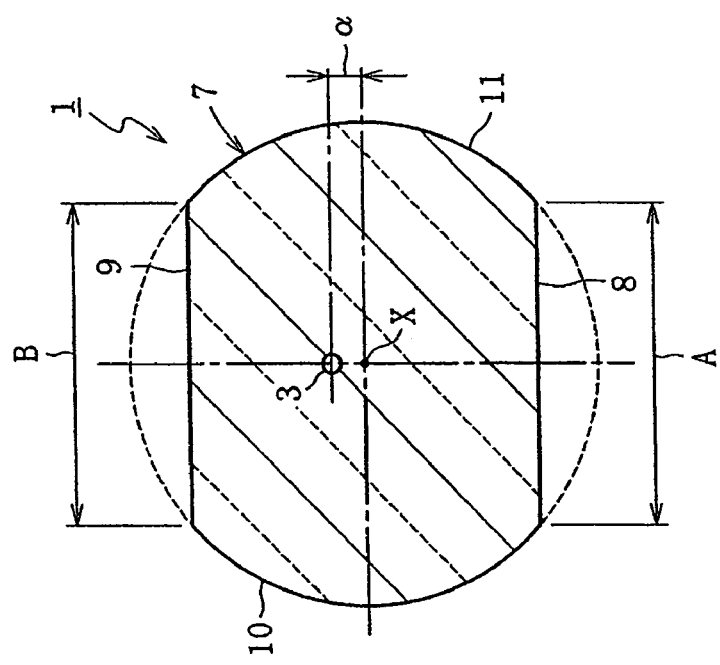
FIG. 2(a) is a front view of a vertical cross-section of the glass capillary tube for holding an optical fiber related to the first embodiment.
Figure 2B:
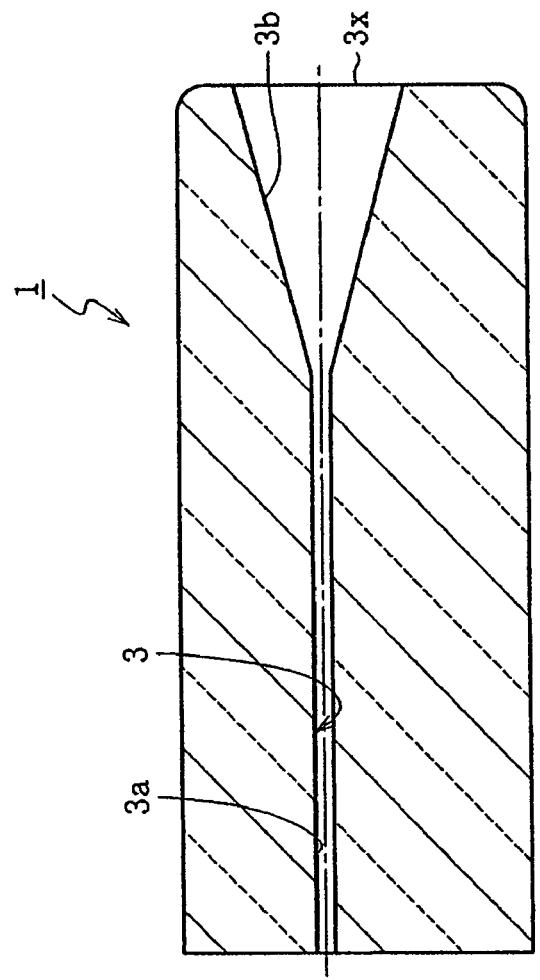
FIG. 2(b) is a side view of the vertical cross-section.

FIG. 2(a) is a vertical cross-sectional view in which the glass capillary tube 1 is cut at a right angle to the optical axis, and FIG. 2(b) is a vertical cross-sectional view in which the glass capillary tube 1 is cut along the optical axis. As illustrated in FIG. 2(a), an exterior surface 7 of the glass capillary tube 1 is composed of two flat portions 8, 9, and two partial cylindrical portions 10, 11 connecting with the flat portions 8, 9. In particular, the exterior surface 7 is composed of a first flat portion 8, which serve as a benchmark, a second flat portion 9 parallel to the flat portion 8, a first partial cylindrical portion 10 connecting from an end of the first flat portion 8 in a widthwise direction to an end of the second flat portion 9 in the widthwise direction, and a second partial cylindrical portion 11 connecting from another end of the first flat portion 8 in the widthwise direction to another end of the second flat portion 9 in the widthwise direction. The first partial cylindrical portion 10 and the second partial cylindrical portion 11 have the same central axis X (axis of origin) and are defined by a common radius, and a total region (total surface area) of the two partial cylindrical portions 10, 11 covers at least 20% (with an upper limit at about 80%) of an entire region (entire surface area) of the exterior surface 7.

In this case, the above described insertion hole 3 (particularly the central axis of the insertion hole 3) is formed at a position deviated from the above described central axis X by a predetermined dimension a toward the second flat portion 9 side in a direction (height-wise direction) perpendicular to the first flat portion 8. In this embodiment, dimension A of the first flat portion 8 in the widthwise direction is the same as dimension B of the first flat portion 8 in the widthwise direction. Therefore, the above described insertion hole 3 is formed at a position deviated from a center (in this embodiment, a straight line that extends in the widthwise direction where the central axis passes through) of the first flat portion 8 and the second flat portion 9 in the height-wise direction by the same above described predetermined dimension a toward the second flat portion 9 side. Furthermore, the above described insertion hole 3 is formed at a center of the glass capillary tube 1 in the widthwise direction, and a flared portion 3b of which a diameter gradually increases towards the rear end is formed such that it smoothly connects the rear end of the insertion hole 3, as illustrated in FIG. 2(b). A diameter of rear end opening portion 3x of the flared portion 3b is increased by three to eleven times that of the front end portion 3a, depending on a diameter (to be covered) of the optical fiber inserted. In the first embodiment, the rear end opening portion is increased by nine times.

The glass capillary tube 1 is made of borosilicate glass with a thermal expansion coefficient of 30 to $70 \times 10^{-7}$/K under an operating temperature range, and is produced by performing a drawing process. Furthermore, the glass capillary tube 1 has a light transmittance of at least 60%, for a glass thickness of 1 mm and a wavelength of 350 nm to 500 nm. In a case where the glass capillary tube is made of glass material containing alkali ions, the glass capillary tube may be strengthened by generating a compressive stress layer on a surface by ion exchange. An Ra value of surface roughness of the first flat portion 8 and the second flat portion 9 is at most 0.1 μm.

Figure 3:
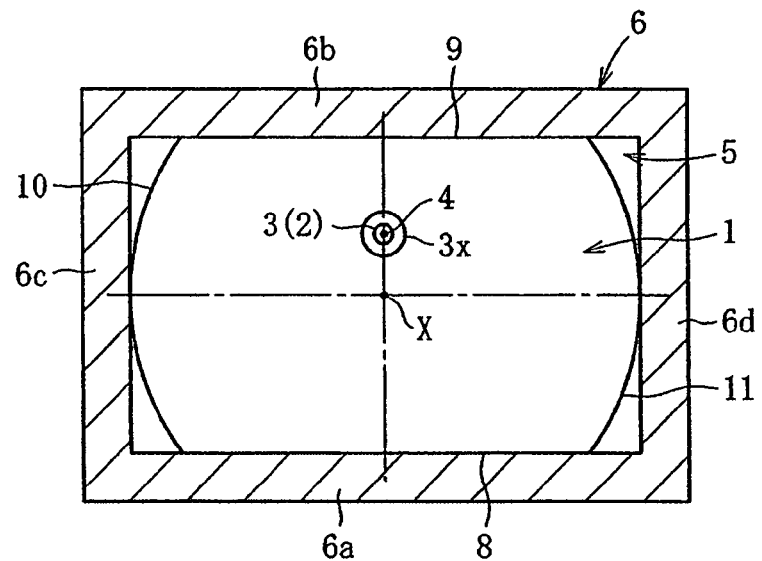
FIG. 3 is a front view of the vertical cross-section illustrating the glass capillary tube for holding an optical fiber, and an overview structure of its periphery related to the first embodiment.
Figure 4:
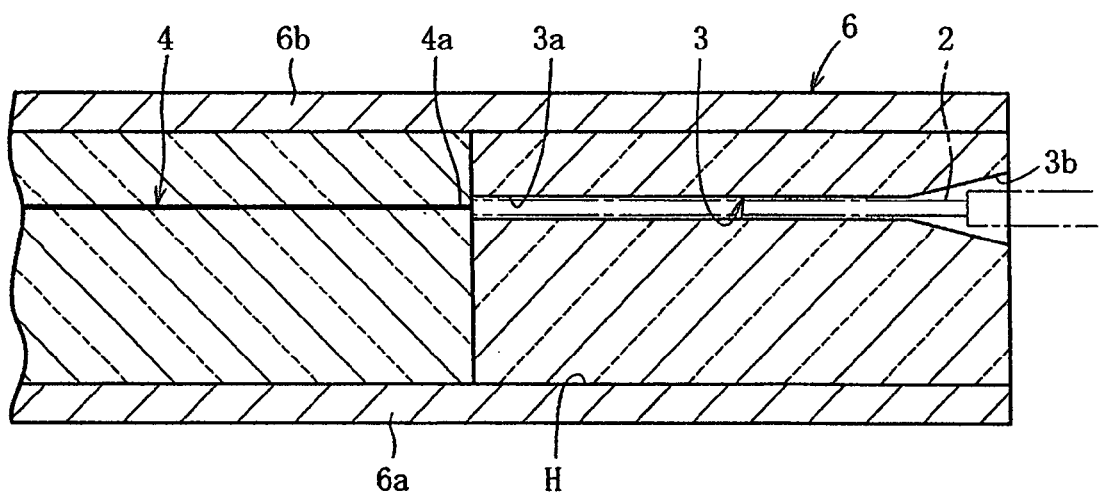
FIG. 4 is a side view of the vertical cross-section illustrating the glass capillary tube for holding an optical fiber, and an overview structure of its periphery related to the first embodiment.

As illustrated in FIG. 3 (FIG. 1), a cross-sectional shape of the optical waveguide device 5 cut at a right angle to the optical axis is a rectangle, and its dimensions in the widthwise direction and the height-wise direction are respectively the same or approximately the same as largest dimensions of the glass capillary tube 1 in the widthwise direction and height-wise direction. In addition, the rear end 4a of the core 4 within the optical waveguide device 5 is formed at a position at a center of the widthwise direction and deviated above a center of the height-wise direction. As illustrated in FIGS. 3 and 4, the rear end 4a of the core 4 within the optical waveguide device 5 and the insertion hole 3 of the glass capillary tube 1 are arranged in approximately a straight line under a condition where the glass capillary tube and the optical waveguide device are housed within the casing 6, or in other words, where the glass capillary tube 1 together with the optical waveguide device 5 are provided on base plane H of the casing 6, and a core of the optical fiber 2 held within the insertion hole 3 of the glass capillary tube 1 and the core 4 of the optical waveguide device 5 are in a state of approximate alignment. Even when they are not in alignment, a largest deviation will be about 50 μm and an alignment process can be easily performed by slight adjustment.

Therefore, as illustrated in FIG. 3, four exterior sides of the glass capillary tube 1 and the optical waveguide device 5 are covered by bottom wall 6a, top wall 6b and two side walls 6c, 6d of the casing 6. More specifically, the first and second flat portions 8, 9 of the glass capillary tube 1 and a top and bottom of the optical waveguide device 5 respectively face interior surfaces of the bottom wall 6a and top wall 6b of the casing 6, and the first and second partial cylindrical portions 10, 11 of the glass capillary tube 1 and the two side surfaces of the optical waveguide device 5 respectively face interior surfaces of the two side walls 6c, 6d of the casing 6. Such opposing surfaces have completely no gap in between, or even when a gap exists, its largest size is approximately 50 μm.

According to the glass capillary tube 1 with the above structure, since the first and second partial cylindrical portions 10, 11 on the exterior surface 7 have the same central axis X and are defined by a common radius, in production of the glass capillary tube 1, a pair of jigs, for example, may be easily brought into surface contact with the two partial cylindrical portions 10, 11 during a skewing process of an end surface at a final stage processing. Therefore, jigs with simple shapes can be used without increasing a parts count, and a probability of chipping and breaking of the glass capillary tube 1 when held by the jigs can be significantly reduced. In a case of forming the glass capillary tube 1 via a drawing process, even when a deviation is generated around the central axis X of the glass capillary tube 1 during this forming process, since the first and second partial cylindrical portions 10, 11 have the same central axis X and are defined by a common diameter, an external diameter of the glass capillary tube 1 can always be measured without variation in dimension regardless of the deviation. Accordingly, a dimension of an external diameter of the glass capillary tube 1 can be measured with great precision, extremely accurate dimensional control of the drawing process can be performed, and inaccuracy or variation in the final glass capillary tube 1 is not likely to occur. Further, since the insertion hole 3 of the glass capillary tube 1 deviates from the central axis X by a predetermined dimension a in the height-wise direction, a position of the insertion hole 3 can be aligned with a position of the rear end 4a of the core 4 in the optical waveguide device 5 by merely setting this deviation dimension a to an appropriate value. Accordingly, freedom in design with respect to a shape of the exterior surface 7 of the glass capillary tube 1 is increased, an adhering area with the optical waveguide device 5 having a rectangular adhering end surface can be sufficiently secured, and adequate adhering strength can be achieved.

The glass capillary tube 1 includes the first flat portion 8 that can be stably set on the base plane H, and the insertion hole 3 is formed at a position deviated from the central axis X in the direction perpendicular to the first flat portion 8 as a benchmark such that the optical axis of the optical waveguide device 5 and the central axis of the glass capillary tube 1 are approximately matched. Therefore, the core 4 of the optical waveguide device 5 and the core of the optical fiber 2 held in the insertion hole 3 of the glass capillary tube 1 can be easily aligned.

In addition, since the glass capillary tube 1 includes the first flat portion 8 and the second flat portion 9, during a skewing process of the end surface thereof, a skewed surface can be accurately formed using either of the flat portions as a benchmark.

Figure 5:
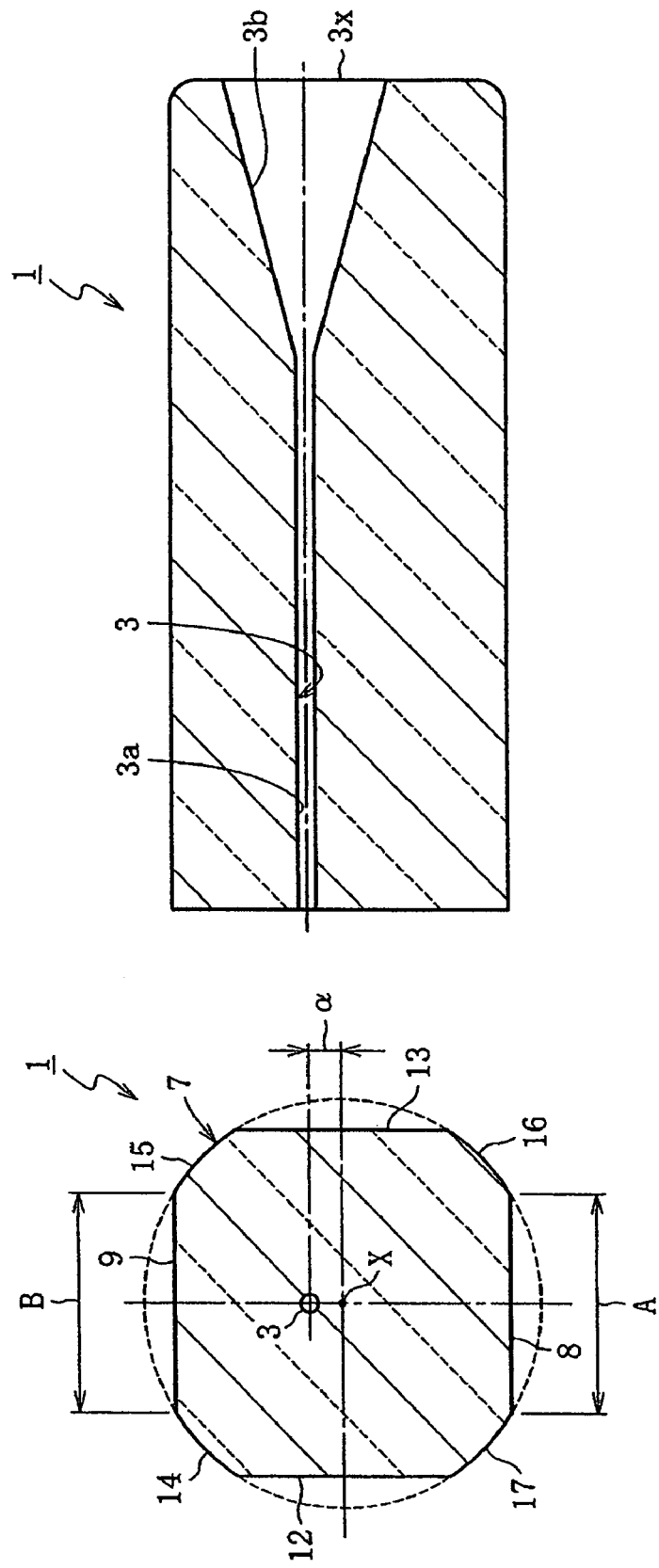
FIG. 5(a) is a front view of a vertical cross-section illustrating a glass capillary tube for holding an optical fiber related to a second embodiment of the present invention.
FIG. 5(b) is a side view of the vertical cross-section.
Figure 6:
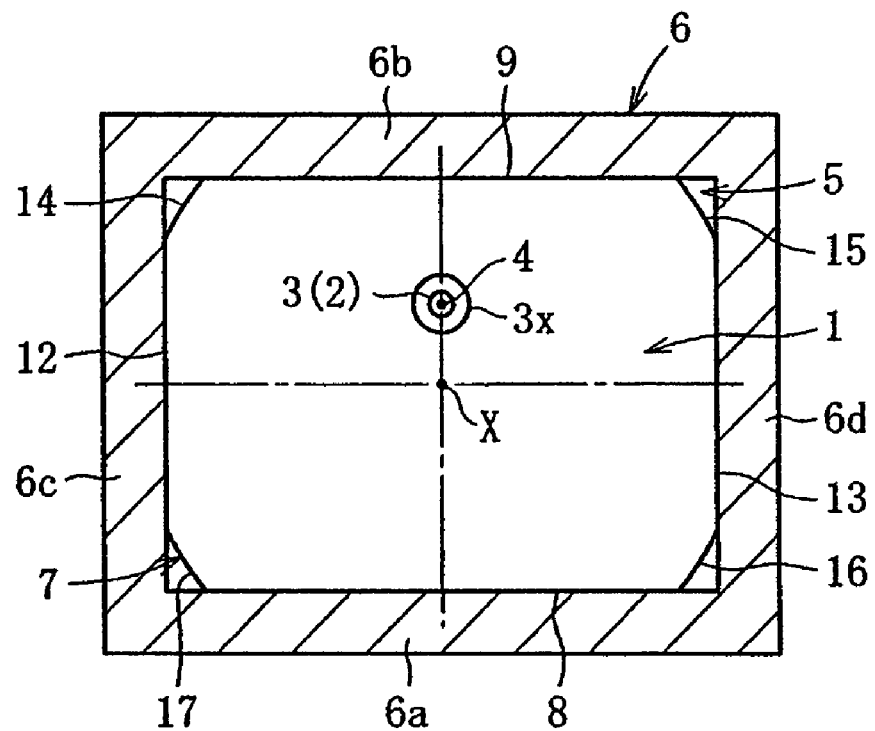
FIG. 6 is a front view of the vertical cross-section illustrating the glass capillary tube for holding an optical fiber, and an overview structure of its periphery related to the second embodiment.

FIGS. 5(a) and 5(b) illustrate a glass capillary tube related to a second embodiment of the present invention, wherein FIG. 5(a) is a vertical cross-sectional view in which the glass capillary tube is cut at a right angle to an optical axis, and FIG. 5(b) is a vertical cross-sectional view in which the glass capillary tube is cut along the optical axis. As illustrated in FIG. 5(a), the glass capillary tube 1 related to the second embodiment is different from the glass capillary tube 1 related to the first embodiment in that third and fourth flat portions 12, 13 perpendicular to the portions 8, 9 are formed on two sides of the first and the second flat portions 8, 9, in a widthwise direction, as part of exterior surface 7. In addition, first to fourth partial cylindrical portions 14, 15, 16, 17 are formed adjacent to and in between all the flat portions 8, 9, 12, 13, respectively. All the partial cylindrical portions 14 to 17 have the same central axis X and are defined by a common radius, and a total region (total surface area) of these partial cylindrical portions 14 to 17 covers at least 20% (with an upper limit at about 80%) of an entire region (entire surface area) of the exterior surface 7. Further, insertion hole 3 deviates from the central axis X (in this embodiment, also exists at a center between first flat portion 8 and second flat portion 9) by a predetermined dimension a toward the second flat portion 9 side and is formed at a center of the glass capillary tube 1 in the widthwise direction. As illustrated in FIG. 5(b), a diameter of rear end opening portion 3x of flared portion 3b in insertion hole 3 is increased by nine times that of front end portion 3a. As illustrated in FIG. 6, the first to fourth flat portions 8, 9, 12, 13 of the exterior surface 7 of the glass capillary tube 1 face inner bottom wall 6a, inner top wall 6b and two inner side walls 6c, 6d of casing 6, respectively, and four sides of optical waveguide device 5 also face each inner surface of the casing 6, respectively. Such opposing surfaces have completely no gap in between, or even when a gap exists, its largest size is approximately 50 μm. Therefore, according to the glass capillary tube 1 related to the second embodiment, an adhering area with the optical waveguide device 5 can be more widely secured. Since other features are the same as the above described first embodiment, same reference characters are used for common constituent elements of the two in FIGS. 5 and 6, and their description is omitted.

The glass capillary tube 1 related to the present invention is not limited to the first and second embodiments described above, but can be of various variations as described below.

Figure 7:
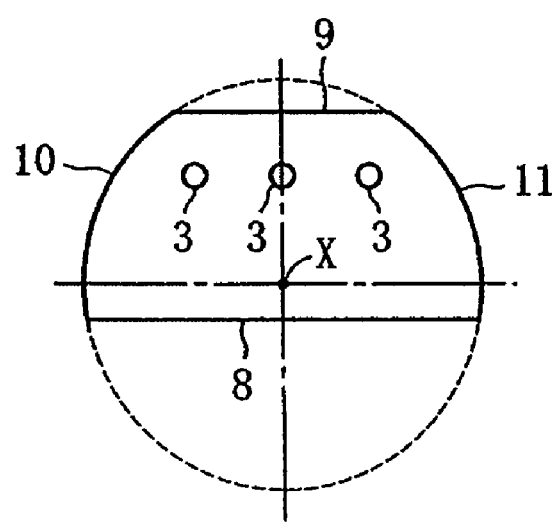
FIG. 7 is a front view of a vertical cross-section (hatching omitted) illustrating a glass capillary tube for holding an optical fiber related to a third embodiment of the present invention.
Figure 8:
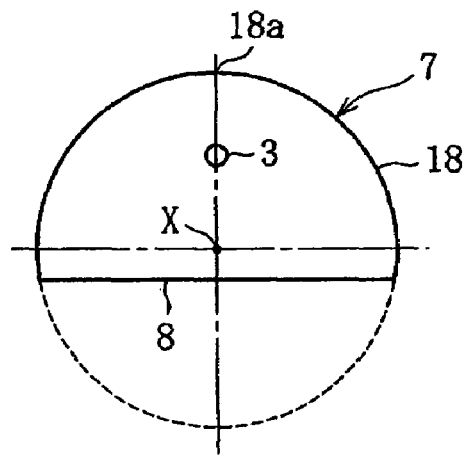
FIG. 8 is a front view of a vertical cross-section (hatching omitted) illustrating a glass capillary tube for holding an optical fiber related to a fourth embodiment of the present invention.
Figure 9:
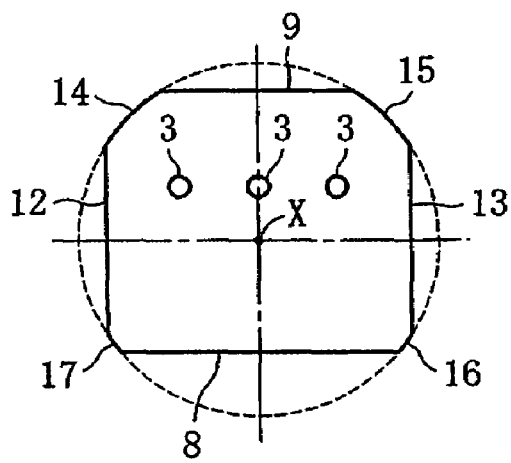
FIG. 9 is a front view of a vertical cross-section (hatching omitted) illustrating a glass capillary tube for holding an optical fiber related to a fifth embodiment of the present invention.
Figure 10A:
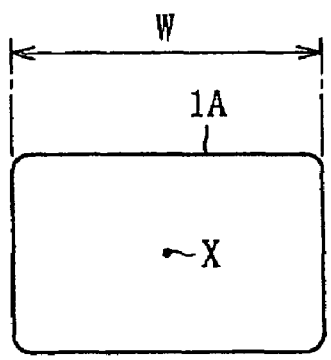
FIGS. 10(a) and 10(b) are respectively a vertical cross-section (hatching omitted) for describing conventional problems.
Figure 10B:
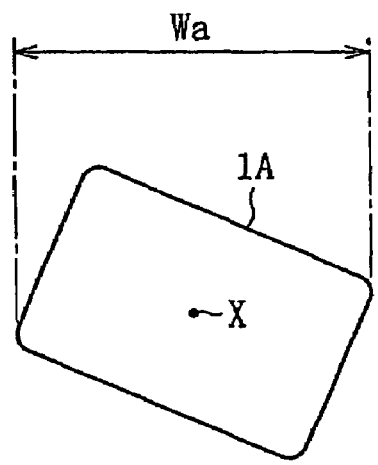

As illustrated in FIG. 7 the insertion hole 3 may be in plurality, such as in this figure three insertion holes 3 may be arranged in a direction parallel to the first flat portion 8, or a dimension of the first flat portion 8 may differ from that of the second flat portion 9 in the widthwise direction such as in this figure, with the dimension of the first flat portion 8 being longer than that of the second flat portion 9 in the widthwise direction. In addition, as illustrated in FIG. 8, the exterior surface 7 may be formed by a single flat portion 8 and a single partial cylindrical portion 18. Alternatively, as illustrated in FIG. 9, in a case where there are four flat portions 8, 9, 12, 13, a dimension of the first flat portion 8 may differ from that of the second flat portion 9 in the widthwise direction and dimensions of two partial cylindrical portions 14, 15 may differ from those of another two partial cylindrical portions 16, 17 in a circumferential direction. Although central axis X of the partial cylindrical portions (10, 11), (18), (14 to 17) of an exterior surface of the glass capillary tube 1 illustrated in FIGS. 7 to 9 is not provided at a center in the height-wise direction, or in other words, a center between the first flat portion 8 and an end portion at an opposite side (second flat portion 9, end portion 18a), the insertion hole 3 deviates from the center in the height-wise direction toward the above described end portions 9, 18a side.

What is claimed is:

1. A capillary tube for holding an optical fiber, the capillary tube comprising:
  an insertion hole in which an optical fiber is to be held;
  a first flat portion located on an exterior surface of the capillary tube;
  a second flat portion located on the exterior surface opposite to the first flat portion and parallel to the first flat portion;
  a third flat portion located on the exterior surface and perpendicular to the first and second flat portions;
  a fourth flat portion located on the exterior surface opposite to the third flat portion, perpendicular to the first and second flat portions, and parallel to the third flat portion; and
  a plurality of cylindrical portions located on the exterior surface of the capillary tube, a first of the cylindrical portions being between and adjacent to the first and third flat portions, a second of the cylindrical portions being between and adjacent to the third and second flat portions, a third of the cylindrical portions being between and adjacent to the second and fourth flat portions, and a fourth of the cylindrical portions being between and adjacent to the fourth and first flat portions, wherein
  the cylindrical portions have a same radius from a single central axis of the capillary tube,
  the insertion hole is located at a position deviated from the single central axis of the capillary tube in a direction perpendicular to the first flat portion, and
  the capillary tube is made of a drawn glass material.

2. The capillary tube according to claim 1, wherein
  when the exterior surface is cut along a virtual plane including the single central axis, even when the virtual plane crosses a horizontal plane or a vertical plane at any angle, all or part of the cylindrical portions exist in both of front and rear sides of the virtual plane.

3. The capillary tube according to claim 2, wherein
the first and second flat portions, the cylindrical portions, and the insertion hole are produced by a performing a drawing process.

4. The capillary tube according to claim 1, wherein the cylindrical portions continue to ends of the first and second flat portions in a widthwise direction of the first and second flat portions such that said partial the cylindrical portions exist are between respective first ends of the first and second flat portions and between respective second ends of the first and second flat portions, respectively.

5. The capillary tube according to claim 4, wherein
the first and second flat portions, the cylindrical portions, and the insertion hole are produced by a performing a drawing process.

6. The capillary tube according to claims 1, wherein
the partial cylindrical portions are continued continue to ends of the first and second flat portions in a widthwise direction of the first and second flat portions such that the cylindrical portions are between respective first ends of the first and third flat portions, between respective second ends of the second and third flat portions, between respective first ends of the second and fourth flat portions, and between respective second ends of the first and fourth flat portions, respectively.

7. The capillary tube according to claim 1, wherein a combined surface area of said partial the cylindrical portions is at least 3% of an entire area of the exterior surface.

8. The capillary tube according to claim 1, wherein
the drawn glass material has a thermal expansion coefficient of 0 to $80 \times 10^{-7}$/K under an operating temperature range.

9. The capillary tube according to claim 1, wherein
the first and second flat portions, said partial the cylindrical portions, and the insertion hole are produced by a performing a drawing process.

10. A method of manufacturing a capillary tube having an insertion hole for holding an optical fiber, the method comprising:
forming a capillary tube from a glass material by a drawing process, wherein the capillary tube includes:
an insertion hole in which an optical fiber is to be held;
a first flat portion located on an exterior surface of the capillary tube;
a second flat portion located on the exterior surface opposite to the first flat portion and parallel to the first flat portion;
a third flat portion located on the exterior surface and perpendicular to the first and second flat portions;
a fourth flat portion located on the exterior surface opposite to the third flat portion, perpendicular to the first and second flat portions, and parallel to the third flat portion; and
a plurality of cylindrical portions located on the exterior surface of the capillary tube, a first of the cylindrical portions being between and adjacent to the first and third flat portions, a second of the cylindrical portions being between and adjacent to the third and second flat portions, a third of the cylindrical portions being between and adjacent to the second and fourth flat portions, and a fourth of the cylindrical portions being between and adjacent to the fourth and first flat portions, wherein
the cylindrical portions have a same radius from a single central axis of the capillary tube, and
the insertion hole is located at a position deviated from the single central axis of the capillary tube in a direction perpendicular to the first flat portion.

* * * * *